(No Model.)
G. W. DUGARD.
MEANS FOR BASTING MEAT, FOWL, &c.
No. 358,968. Patented Mar. 8, 1887.
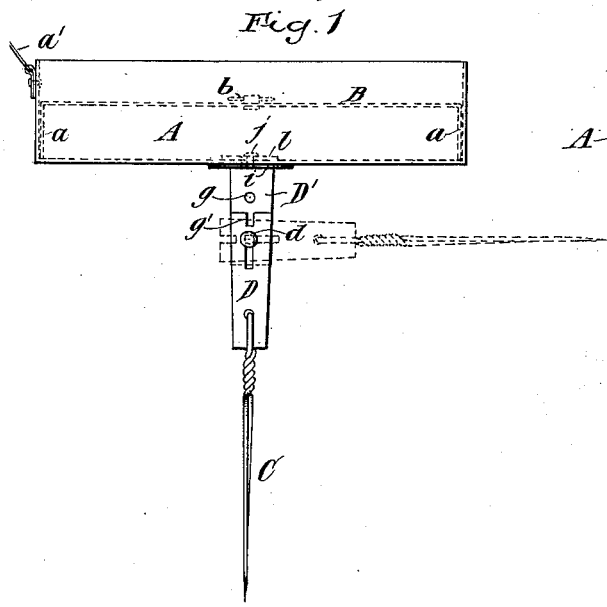
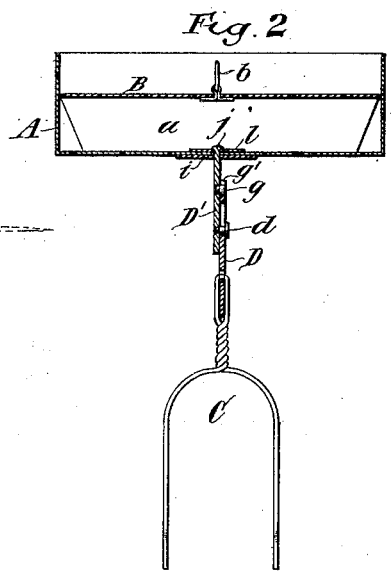
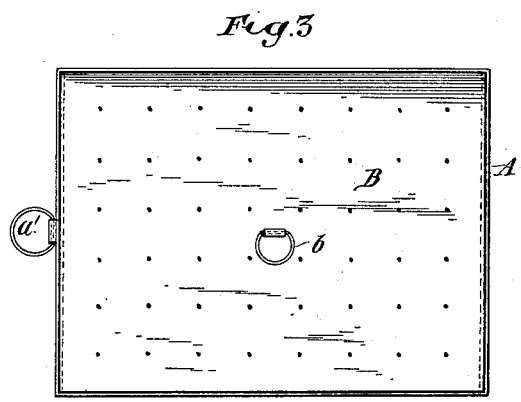
Witnesses
Jas. R. Bowen
James D. Griswold
Inventor
George W. Dugard
by his attorneys
Gifford & Brown

United States Patent Office.

GEORGE W. DUGARD, OF BROOKLYN, NEW YORK.

MEANS FOR BASTING MEAT, FOWL, &c.

SPECIFICATION forming part of Letters Patent No. 358,968, dated March 8, 1887.

Application filed July 29, 1886. Serial No. 209,419. (No model.)

*To all whom it may concern:*

Be it known that I, GEORGE W. DUGARD, of Brooklyn, in the county of Kings and State of New York, have invented a certain new and useful Improvement in Means for Basting Meat, Fowl, &c., of which the following is a specification.

I will describe in detail an article for basting meat, fowls, &c., embodying my improvement, and then point out the novel features in claims. I term this article a "baster."

In the accompanying drawings, Figure 1 is a side elevation of a baster embodying my improvement. Fig. 2 is a transverse section of the same. Fig. 3 is a plan or top view thereof.

Similar letters of reference designate corresponding parts in all the figures.

A designates a receptacle for suet, drippings, gravy, or other suitable or similar material to be used in basting meat, fowl, fish, &c. This receptacle is, as shown, of rectangular form, but it may be of any desired shape. It is made of metal, preferably of iron, and may be stamped up or otherwise formed, as desired. The bottom of this receptacle is perforated, as shown more clearly in Fig. 2. The sides and ends are shown as imperforate.

B designates a tray, which will preferably correspond in shape to the interior of the receptacle A, and may be slipped into and out of the same. The tray is supported at a distance above the bottom of the receptacle. In this example of my improvement it is so supported by means of downwardly-extending portions $a$, formed with or attached to the tray, and which rest upon the bottom of the receptacle; but it might be supported by projections on the interior of the receptacle upon which the tray would rest. This tray is also shown as perforated. The receptacle A is provided with a ring, $a'$, by which it may be hung up when not in use, and the tray B is provided with a ring, $b$, by which it may be inserted in and removed from the receptacle A.

I employ a device for securing the receptacle to meat, &c. In the example of my improvement shown such device consists in prongs C, having sharpened ends, and made of a single piece of wire, which is passed through an aperture formed near one end of a section, D, of the securing device. The wire is bent at about the middle of its length after having been passed through such aperture. The bent portions are brought together beyond the adjacent end of the section D and twisted together, so as to firmly secure them together and upon the section D. The prongs are then bent away from each other, so as to form a fork.

The section D has a swiveling connection with another section, D', of the securing device, and may also be moved longitudinally of said section D'. It is swiveled upon a pin, $d$, extending from the section D', through a longitudinal slot in the section D, and provided with a head outside said slot, whereby the two sections are retained together.

Upon the side of the section D' is a pin, $g$. In the end of the section D is formed a notch, $g'$. When the two sections occupy the position shown in full lines in Fig. 1, the section D may be slid along on the section D' until the pin $g$ enters the notch $g'$. The two sections will then be retained or locked together in alignment, as shown more clearly in Fig. 2. The prongs C may then be inserted in the meat or other article to be basted, and the receptacle A will be maintained in an upright position. When not thus in use, the section D may be moved so as to bring the notch $g'$ out of engagement with the pin $g$. The section D and the prongs C may then be swung into the position shown in dotted outline in Fig. 1, preparatory to hanging the baster up.

The securing device has, as shown, a swiveling connection with the receptacle A. This connection is made by means of a projection, $j$, extending from the section D' through a suitable aperture in the bottom of the receptacle. Between the section D' and the bottom of the receptacle is a washer or plate, $i$, and within the receptacle and surrounding the projection $j$ is another washer or plate, $l$. The projection $j$ is upset beyond the washer or plate $l$. By this arrangement the receptacle A may be turned about when secured to the meat or other article in order to accommodate it to an oven.

The material to be employed in basting—such as suet, drippings, or gravy—is placed upon the tray B. The heat of the oven causes it to melt and drip through the perforations in the tray onto the bottom of the receptacle A, from which it passes through the perforations in such bottom onto the article to be basted.

By the use of my improvement the meat or other article is basted continuously and effectively without the necessity of opening and thereby cooling the oven, and without the necessity of resorting to the slow and tedious process of basting by hand.

In some cases the tray B may be omitted, and I do not wish to be understood as limiting myself to the particular kind of securing device shown, as many others will readily suggest themselves which would not depart from the spirit of my invention.

What I claim as my invention, and desire to secure by Letters Patent, is—

1. The combination of a perforated pan and a sharp-pointed supporting device secured to its under side for insertion in the meat, whereby said pan may be supported above the meat, substantially as specified.

2. The combination of a perforated pan and a sharp-pointed supporting device for insertion in the meat, connected to the under side of the pan with a swiveling connection, whereby said pan may be supported above the meat and turned about, substantially as specified.

3. The combination of a perforated pan and a sharp-pointed supporting device connected to its under side for insertion in the meat, said supporting device being composed of sections, one of which sections may be swung into two positions, and a retaining device for retaining such section in one position, substantially as specified.

GEORGE W. DUGARD.

Witnesses:
 JAMES D. GRISWOLD,
 D. H. DRISCOLL.